United States Patent [19]

Hamer

[11] 4,417,811

[45] Nov. 29, 1983

[54] METHOD AND DEVICE FOR MAKING PHOTOGRAPHIC COPIES

[76] Inventor: Rudolf Hamer, Heintzmannstr. 166, 463 Bochum , BRD, Fed. Rep. of Germany

[21] Appl. No.: 269,826

[22] Filed: Jun. 2, 1981

[30] Foreign Application Priority Data

Dec. 7, 1979 [DE] Fed. Rep. of Germany ....... 2949290

[51] Int. Cl.[3] .............................................. G03B 27/32

[52] U.S. Cl. ......................................... 355/77; 355/40

[58] Field of Search ....................... 355/77, 50, 40, 41, 355/42, 29, 38

[56] References Cited

U.S. PATENT DOCUMENTS

| | | | |
|---|---|---|---|
| 3,516,741 | 6/1970 | Thaddey | 355/38 |
| 3,768,905 | 10/1973 | Williams | 355/41 |
| 3,811,768 | 5/1974 | Zahn et al. | 355/41 |
| 3,829,214 | 8/1974 | Zahn et al. | 355/38 |
| 3,898,002 | 8/1975 | Kinder et al. | 355/41 |
| 3,947,109 | 3/1976 | Kinder et al. | 355/41 |
| 3,976,376 | 8/1976 | Hujer | 355/40 |
| 3,987,467 | 10/1976 | Cowles | 355/40 |
| 4,128,330 | 12/1978 | Fergg et al. | 355/40 |
| 4,248,528 | 2/1981 | Sahay | 355/77 |
| 4,251,156 | 2/1981 | Zimmermann et al. | 355/41 |
| 4,260,244 | 4/1981 | Laska et al. | 355/77 |
| 4,264,197 | 4/1981 | Pone et al. | 355/50 |
| 4,291,972 | 9/1981 | Laska et al. | 355/50 |
| 4,293,215 | 10/1981 | Rosborough et al. | 355/77 |

*Primary Examiner*—Monroe H. Hayes

*Attorney, Agent, or Firm*—Michael J. Striker

[57] ABSTRACT

A method of making photographic copies during a first order and filing the same for a reorder includes making a positive strip copy of pictures with data relevant to an undeveloped film strip, the negative film is connected to the positive strip copy and provided with a punched code of the processing program and, upon development, the negative is connected to an auxiliary strip of a store cartridge to form a single file unit.

2 Claims, 26 Drawing Figures

FIG.4
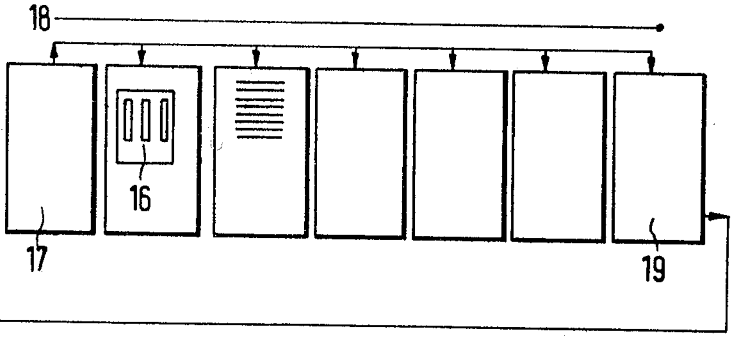
FIG.5
FIG.6
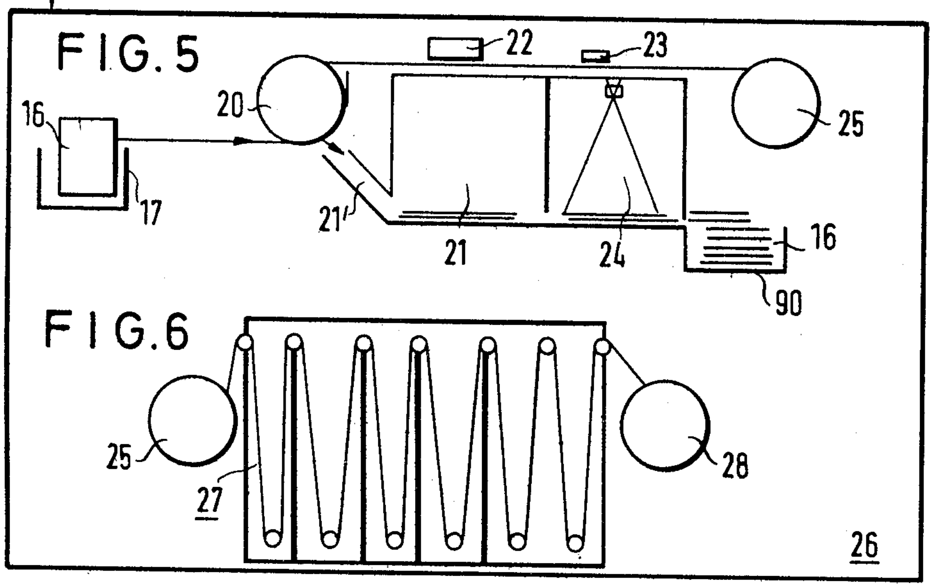
FIG.7
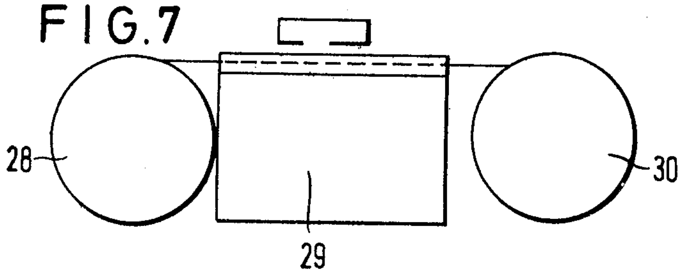
FIG.8
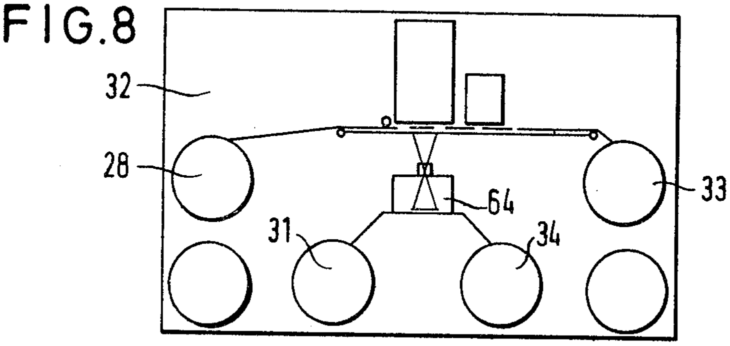

FIG.18
FIG.19
FIG.20
FIG.21
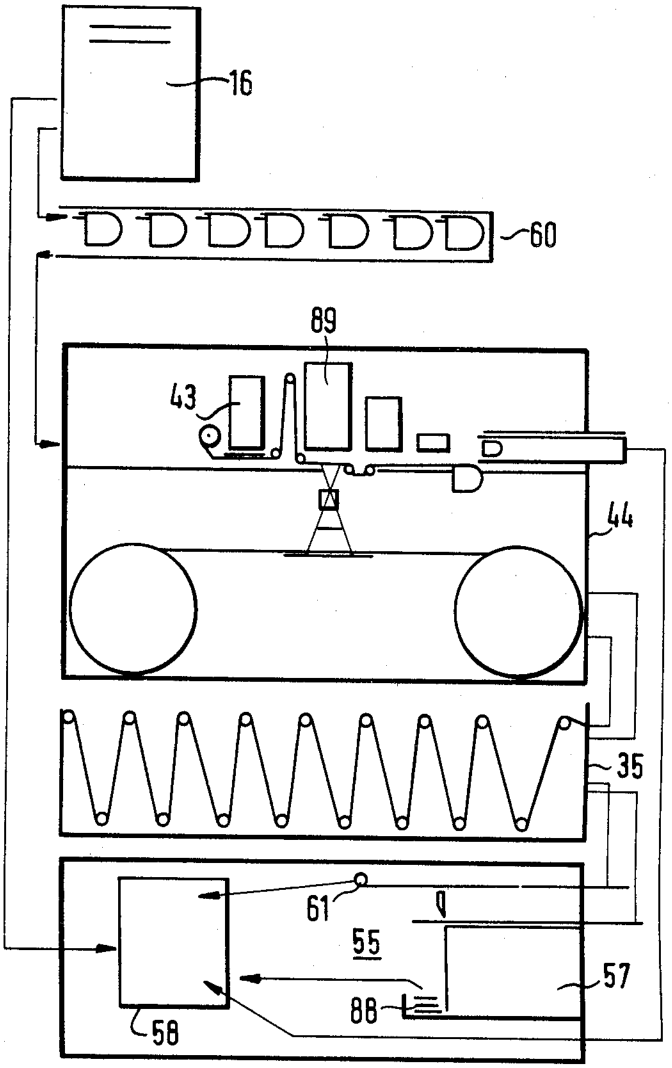
FIG.22
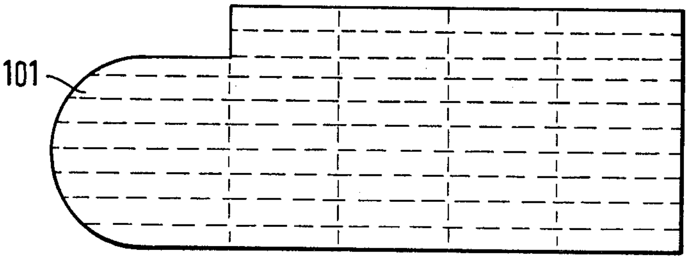

METHOD AND DEVICE FOR MAKING PHOTOGRAPHIC COPIES

BACKGROUND OF THE INVENTION

The invention relates to a method and a device for making photographic copies, as well as an archive or file unit used in connection with this method and this device.

In the phototechnology, in particular the processing of reorders is problematic. Presently, the negative film is cut into sections of 4 to 6 pictures and paper strips (so-called tabs) are bonded thereon for noting the desired number of individual picture copies. In order to make better use of the capacity of the printers, the latest processing methods (Agfa-Reprint-Order-System and Gretag-Computerized-Reprint-System) provide a processing preparation when a plurality of order centers, per printer, are provided. In these centers, the order is prepared by a laboratory person, that is, after removing the tabs from the film strips, the film strips are bonded to a perforated strip and the order is typed out on a floppy disc, or a perforated tape. In the latter case, exposure corrections may be fed, due to error copies of the first printer throughput. However, the repetition of the copying process presents an organisational problem, in addition to the time and material losses. The typing in of the order data is cumbersome and constitutes a source for errors. The described approaches are also unsatisfactory from the point of view of the customer. The customer receives, after processing the film strips, the strips with bonded on celluloid strips which are hard to write on or with newly mounted tabs. The original order is not present any longer. The returned film strips are cut into shorter pieces which makes the storing and the assembly of new orders more difficult, in particular, that individual negatives due to their difficult handling during insertion into the picture frame of the enlarger would be excluded from making large pictures.

Amateurs and professional photographers have a lot of problems in locating and recognizing the picture contents of negatives, as well as in the searching and noting of the picture numbers when assemblying or handling the work orders. Knowledge acquired for improving the picture quality during the first order, is normally lost for reorder purposes.

SUMMARY OF THE INVENTION

It is an object of the invention to provide a method and a device which enables to substantially remove the aforementioned disadvantages. Reorders should be performed with low expenditure and efficiently. Conclusions made for optimizing the quality of individual copies should be maintained for later reorders. The original films should be well protected and stored in an orderly manner.

A method for making photographic copies of uncut film strips which at the first order are stored in a camera cartridge or a cassette in the undeveloped condition, and which are delivered with an order pocket which carries the general order data such as, type of film, type of copy, size of the copies, and the like is characterized in accordance with the invention in that during the first order processing a positive strip copy is made with individual picture data fields which are individually arranged with the positive pictures for receiving relevant machine readable processing data for copying orders and are connected with the film strip, as well as combining the arrangement consisting of film strip and positive strip copy with an archive cartridge into a permanent archive unit.

An inventive archive or file unit for use with this method consists of a developed film strip, a positive strip copy with the individual positive pictures with individual picture data fields connected therewith, as well as an archive cartridge.

A device for carrying out the method is characterized by a printer with means for a synchronous transporting of the film strip and the positive strip during the first order processing, a device for establishing exposure measurement values for the film strip, a device for establishing exposure correction values which are entered in individual picture data fields of the positive strip and a device for automatic control of the exposure in dependency from the exposure measurement values and the exposure correction values read from the positive strip. In particular, for the reorder processing in a further embodiment of the invention means are provided for an automatic removal of an archive cartridge filled with film and positive strips, a magazine receiving a plurality of such cartridges during a reorder processing, means for pulling out of the archive cartridge the positive strip and the film strip connected therewith, an order reading device, a device for automatic controlling of exposure and transport in dependency from the read order data and the exposure measurement and the correction values, means for rolling up the film and positive strip, and means for advancing the magazine.

With the invention, the finding of negatives and the associated numbers is eliminated. Positive pictures in the series at which they were taken are always present. The judgement of the color quantity is substantially facilitated by the positive strip. Problems with respect to communication and defined wishes by the customer are removed from the processing step. The customer knows what he ordered and what he can expect from the processing. No order processing centers are required for repeat orders. In addition to the original film strip the archive cartridge contains all other necessary data for processing. Errors are eliminated due to the machine read data. The quality of the work is constant and generally better than is customary today, due to the corrections which are stored during the first order processing. Repititions of copying processes because of unsatisfactory copy quality are eliminated. A clean and sufficient storage as well as processing of the film material is assured.

BRIEF DESCRIPTION OF THE DRAWING

The invention will be explained in the following in more detail in conjunction with preferred exemplified embodiments. The attached drawings show.

DESCRIPTION OF THE PREFERRED EMBODIMENTS

Figures 1A, 1B:
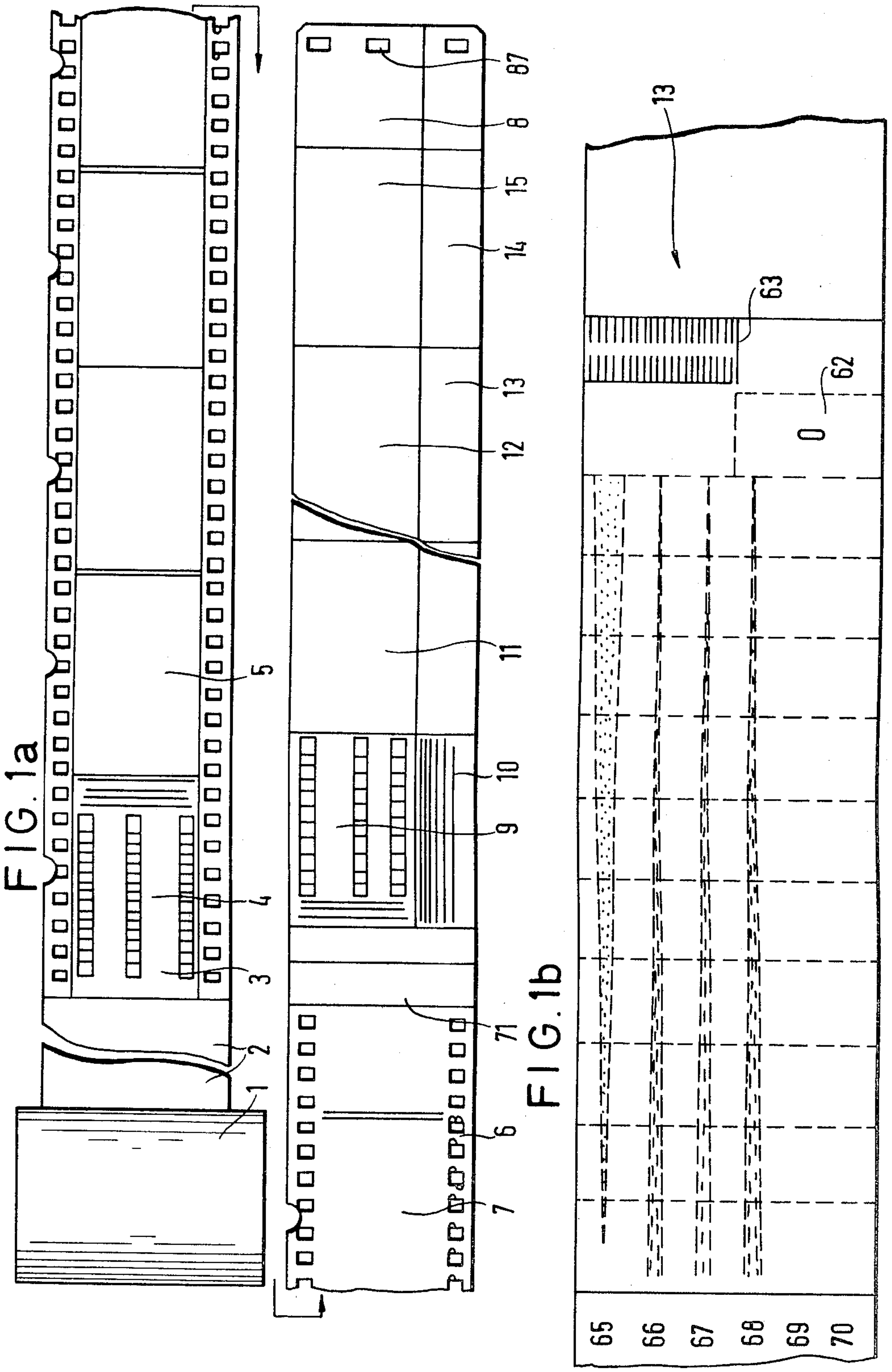
FIG. 1*a*—an inventive archive or file unit.
FIG. 1*b*—in an enlarged scale one of the data fields of the positive strip.

The file unit in accordance with FIG. 1, which is established during the first order processing is provided with a filing cartridge 1 containing an end strip 2 to which an uncut developed negative film strip 3 is so attached that during the processing of reorders the last negative picture 5 can still reach the exposure gate of a printer. Before developing the negative film 3, as explained later, behind the last picture 5 thereof, the front side of an order pocket 16 (FIG. 2*c*) for the first order is exposed in the picture field 4. A positive print strip 8 at a reduced scale was made by printer 32 (FIG. 8) of film 3. Its positive pictures show what the automatic exposure and color analyzer of the printer brings out without subjective human correction input. A filter analyzer can devise corrections from the positive pictures of strip 8 which result in the desired color reproduction when subsequently making the copies. These corrections are entered into data fields 13 which are associated with each individual picture of the positive strip 8.

The first picture of the negative film is designated with reference numeral 7 in FIG. 1*a*. The positive strip 8 is bonded to the first picture 7 of the negative film 3 as a leader. A data field proof is exposed below each picture of the leader. Picture frame 9 in positive strip 8 contains the positive picture of the negative 4. At a later time a signal indicating the completion of the order is entered in the lower part of the data field 10. The reference numeral 11 indicates the positive of the last picture 5 of the negative film 3, while reference numeral 12 indicates the positive picture of the first negative 7.

The data fields 13, one of which is shown in an enlarged scale in FIG. 1*b*, contain respectively an input field 62 for a dominant- O-code which in the printer effects an advance of the film without exposure, a positioning line 63, an input field 65 for the correction of the total exposure, an input field 66 for the correction of the blue exposure, an input field 67 for the correction of the green exposure, an input field 68 for the correction of the red exposure, an input field 69 for orders from 10 to 90 copies, and an input field 70 for orders from 1 to 9 copies.

Figures 2A, 2B, 2C, 2D:
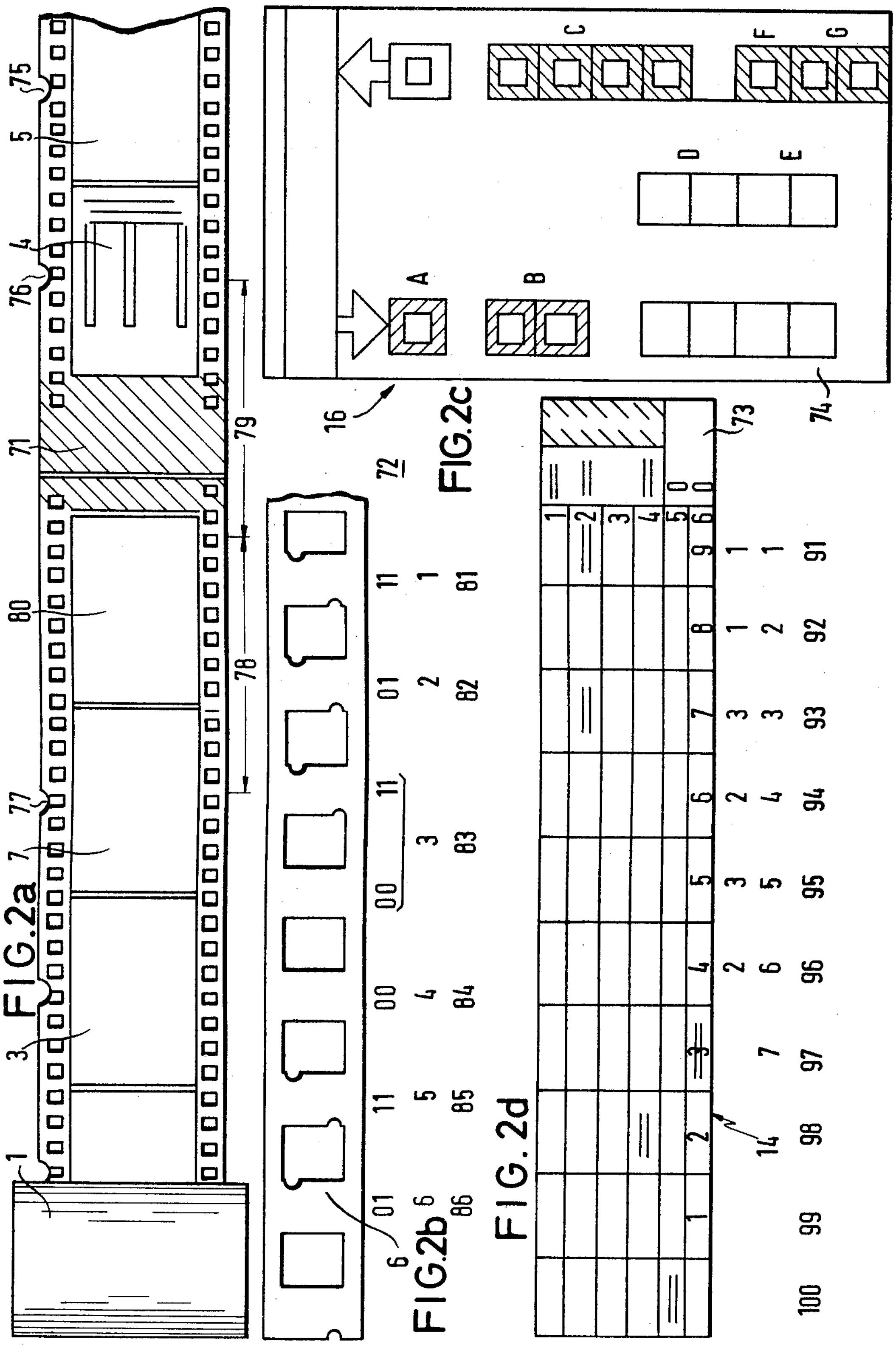
FIG. 2*a*—the manner of assemblying the film strips before developing the positive strip, FIG. 2*b*—in an enlarged scale a control strip portion which is punched into the negative film strip, FIG. 2*c*—in an enlarged scale a schematic view the front side of the order pocket, FIG. 2*d*—in an enlarged scale the data field of the positive strip into which the data contents of the order pocket is entered, FIG. 3—schematically the process of the inventive method, FIG. 4—the input sorting of the first orders, FIG. 5—a device for punching the control strip portion and for exposing the order pocket onto the undeveloped negative film strip, FIG. 6—a device for developing the negative film strip, FIG. 7—a device for punching the switching marks into the negative film strip, FIG. 8—a printer for exposing the undeveloped positive strip, FIG. 9—the development device for the positive strip, FIG. 10—a correction station for evaluating the picture quality in conjunction with the positive strip copy, FIG. 11—a production printer during processing of first orders, FIG. 12—the development device which is attached to the printer in accordance with FIG. 11, FIG. 13—a rolling up device, FIG. 14—the finish processing of the first order at the assembly station, FIG. 15—the preparation of repeat orders, FIG. 16—the production printer during processing of reorders, FIG. 17—the assembly station for reorders, FIGS. 18 to 21—schematically the processing of reorders corresponding to a different embodiment, and FIG. 22—a blank or data support serving as an auxiliary record.

The bonding location between the negative film 3 and the leading positive strip 8 is designated by reference numeral 71. The film and the leader are so bonded together that the film leader is available for a control template 6 (FIG. 2*b*). At the front end of leader 8, an empty picture field 15 is provided with an associated data field 14 (FIG. 2*d*) and catches 87 for the pulling tape of the operating device (printer).

In FIG. 1*b*, wedges on the positive strip 8 are indicated with dash-dot lines in the input fields 65 to 68. The exposure correction indication can be advantageously made in or below these wedges, at a place depending from the desired correction. Such indications which preferably are in the form of erasable, locating marks are made so as to perform a change of the correction values depending on the wishes of the customer.

FIGS. 2*a* to 2*d* show the example of a coding on the beginning of the film (FIGS. 2*a* and 2*b*), the front side of the order pocket (FIG. 2*c*) and the leader 8 (FIG. 2*d*). The coding area generally designated by numeral 74 of the order pocket 16 is provided with different coding fields. The coding fields which are reserved for first orders, for example, fields A,B,C,F and G are provided with a hatched frame while simply bordered coding fields, for example fields D and E are reserved for reorders. For example, the coding fields contain data concerning the type of film, the kind of copies, the size of the paper and the like. The object of the work is defined by filling out the coding fields. The relevant data from the coding fields of the order pocket 16 are transferred in form of punched out holes are transferred onto the control strip 6 at the beginning of the film before the film is developed in the dark room 26 for the first processing. The space 78 for the control strip 6 is indicated in FIG. 2*a*. One exemplified embodiment of the finished control strip is shown in an enlarged scale in FIG. 2*b*. The positions 81 to 86 of the first processing code designated general with 72 are binary expressions for the data on the front side of order pocket 16 which define or control the number of exposures per picture, the size of the picture and the type of paper, the coexposure of one or a plurality of archive strips, and the like, during the processing in the operating printer.

Figure 11:
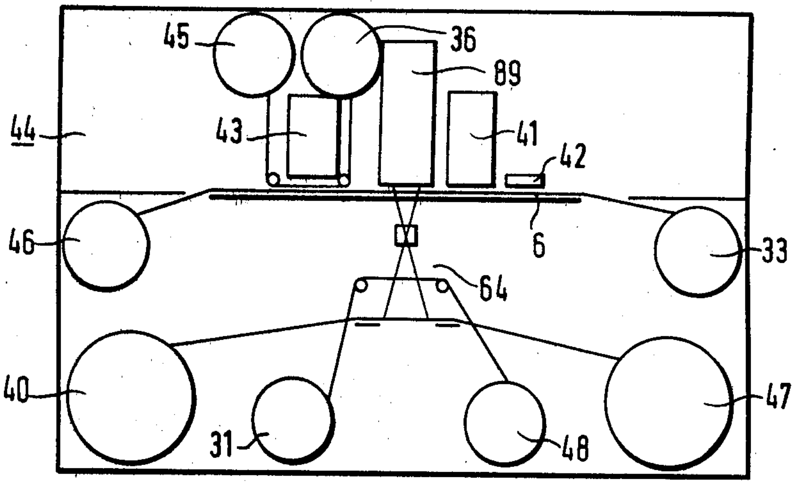

The data of the control strip 6 are picked up by a reading device 42 of the printer (FIG. 11). The reading device is activated of the signal of a delay chain by the electronic control of the printer, after a lack of switch hole signals triggered by switch holes or switch notches 75,76,77 (FIG. 2*a*) has been determined after a distance corresponding to one picture length (transport path 79 in FIG. 2*a*). For example, the input signals may have the following meaning:

| | | |
|---|---|---|
| 81 | with binary code | 11: Processing of negative film plus positive |
| 82 | with binary code | 01: Kodak-film |
| | with binary code | 10: Agfa-CNS-film |
| | with binary code | 11: Fuji-film |
| | with binary code | 00: Sakura-film |
| 83 | with binary code | 00 01: Size of picture 7 × 10 cm |

-continued

| | | |
|---|---|---|
| | with binary code | 00 10: Size of picture 9 × 9 cm |
| | with binary code | 00 11: Size of picture 13 × 18 cm |
| | with binary code | 01 00: Size of picture 9 × 13 cm |
| | with binary code | 01 01: Size of picture 10 × 15 cm |
| | with binary code | 01 11: Special size |
| 84 | with binary code | 00: Glossy paper |
| | with binary code | 01: Dull paper |
| 85 | with binary code | 01: 1 copy per negative |
| | with binary code | 10: 2 copies per negative |
| | with binary code | 11: 3 copies per negative |
| 86 | with binary code | 01: 1 additional file tape |
| | with binary code | 10: 2 additional file tapes |

The function of the control strip portion 6 is completed when the processing of the first order is completed. For reorders, these tasks are taken over by the data field 14 of leader 8 wherein the corresponding data are automatically transferred by reading the order pocket. The coding 73 of this data field is shown in an enlarged scale in FIG. 2*d*. The reorder codes 91 to 96 correspond to codes 81 to 86 for the first order. Data ranges of data field 14 for positions 97 to 100 are assigned to the ranges of the order pocket 16 which are not relevant to the automatic processing during the first order, like among other things, the making of dias strips in the size of 24/36 and 32/45, program strips, particular shapes of archive or file strips, and the like. These orders are entered by the customer or the receiving center. The latter can therefore assure a perfect work concerning the color quality and an exact performance of the order.

Figure 3:
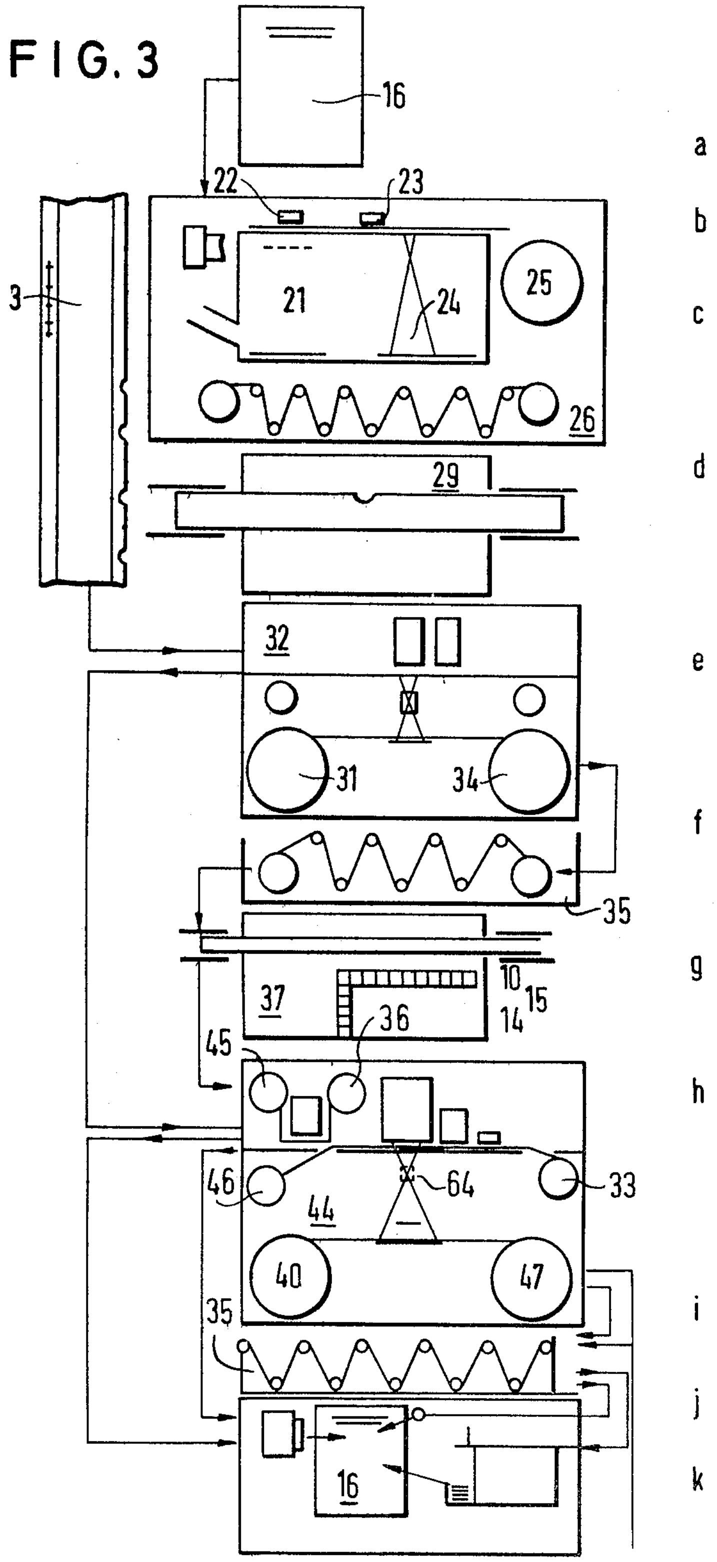

FIG. 3 shows schematically the process of the operating program controls. In the operating steps a,b and c the first processing program is transferred from the order pocket 16 into the control strip portion 6 of the undeveloped negative film. After the development in dark room 26 (FIGS. 5 and 6) and after punching the switch holes 75,76, 77 by means of a picture marking puncher 29 (step d), the leader 8 with the picture strip and the data strip are exposed in printer 32 (step e) and developed (operating step f). Exposure correction values, if required, are put into the data fields 13 at a control desk 37. In defective pictures, dominant-O-codes are entered, so as to prevent unnecessary losses (step g). Reels 33 and 39 with consecutively loaded negative films 3 or corrected leader strips 8 of a plurality of orders, are placed into a production printer 44. The production copies are made in dependency from the data of strips 3 and 8 (operating step h,i and j). After the exposure and the development, the negative 3 and leader 8 of each film are bonded onto the end strip 2 of cartridge 1. The positive pictures are cut, the order is assembled (operating step k).

The operating steps which were described summarily in conjunction with picture 3, will now be explained in more detail with respect to FIGS. 4 to 14.

In accordance with FIG. 4, baskets 17 with unsorted order pockets 16 are delivered to an incoming sorting location 18 where the incoming new orders are sorted, that is, the order pockets are separated in accordance with operating steps and are then delivered to the operating stations in baskets 19.

In the dark room 26 (FIG. 5) the pictures or camera cartridges 20 will be removed from the pockets 16 which contain the first orders. The cartridges 20 are opened. The beginning of the film is introduced into a bonding machine 23, while the empty order pocket 16 is inserted into a slot 21' of a reading device 21. There, the order inputs in the filled out hatched bordered input fields are read mechanically, are tested to conformity with the operating program and are punched into the film beginning at control strip 6, by means of a punching device 22 simultaneously with the bonding of the film beginning to the film end of the preceeding film which has already been partially rolled up on a reel 25. The last order pocket 16 moves from the reading device 21 into an exposure unit 24 for exposing the front side of the order pocket 16 of this film 3 onto the last field 4 of film 3 simultaneously with the bonding and punching operation. Thereafter, the order pocket is moved to a box 90.

The full reel 25 is placed into the development machine 27 (FIG. 6) and the film beginning is hooked up to the pulling tape of the machine. After passing through the machine, the attached films leave the dark room 26 in a dry condition and are rolled up on a reel 28, whereby the film beginning is located on the outside. Thereafter, the film which is drawn off from reel 28 is subsequently fed into the picture marking punching device 29 (FIG. 7), wherein the punch holes 75,76,77 etc. are punched, while the film is rolled up with the end to the outside onto a reel 30. The film is reeled back onto reel 28 and is subsequently placed into the printer 32 (FIG. 8). Furthermore, a cassette 31 with unexposed 35 mm wide positive paper tape is inserted into the printer. The pictures are exposed onto the positive strip 8 which is taken from the cassette at a size of 24×36, whereby simultaneously a proof or blank of a data field 13 is exposed below each positive picture by means of an exposure device 64. The negative film 3 rolls on a reel 33 with the end at the outside, while the paper tape is rolled up on a reel in a roll up cassette 34 with the end to the outside.

Figure 9:
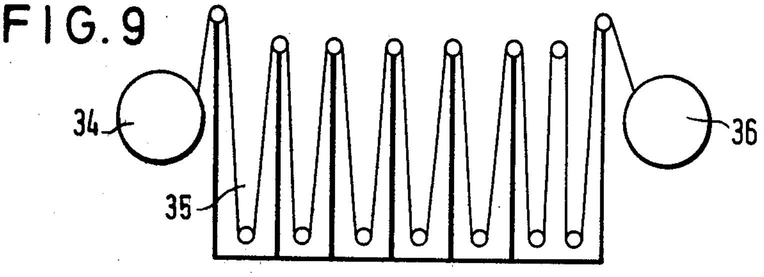
Figure 10:
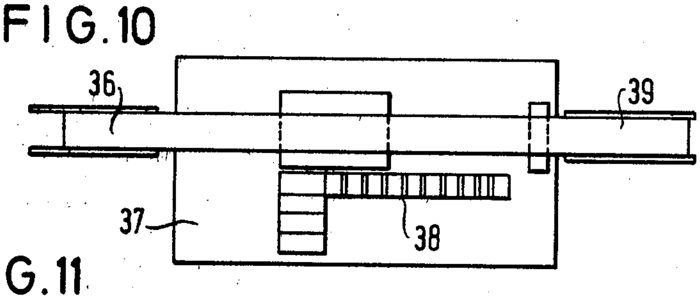

The exposed 35 mm paper tape passes through a positive paper development machine 35 and is rolled up on a roll up coil 36 with the end to the outside (FIG. 9).

The reel 36 which supports the positive strip 8 is placed into the control or correction desk 37 (FIG. 10) which is provided with an observing and writing device 38. The pictures of the positive strip are tested at the end of the control desk. Depending on the requirements exposure and color corrections as well as dominant-O-markers for nonuseable pictures, which should not be processed, are fed into the individual picture data fields 13. Thereby, the last picture of each order with the exposed order pocket 16 in field 4 receives the order completed marking in data field 10. The positive strip which at first is rolled up on a reel 39 during the test and correction operation is rolled back onto reel 36 with the beginning to the outside.

The reel 36 with the positive strip and the reel 33 which supports the negative tape are placed into the production printer 44 (FIG. 11). Both strips pass through the printer and are rolled onto reels 45 or 46. During this operation, the negative strip is read by means of the reading device 42. The program which is stored in control bar 6 is transferred to the memory of the printer computer. During the throughput, a scanner 41 measures the color densities of the negative strip and stores the same. Simultaneously, the data fields of the positive strip are read by means of a reading device 43 and the corresponding values are also put into the memory of the computer. Both values determine the position of the exposure color control in the filter-mirror chute 89 of the printer. In the previously described first order processing, the control strip portion 6 of the film 3 provides the data of the type of film and thereby the automatic selection of the corresponding color memory for the exposure control is switched on. During reorder processing these data are read from the data field 14 of the leader 8 which, for example, is provided with a corresponding code when assemblying the first order before rolling up the leader 8 and the film tape 3 into cartridge 1. Printer 44 is provided with a device for simultaneous exposures. For example, it has a cassette with unexposed 35 mm wide positive paper and a cassette with a reel for 90 mm copying paper. The positive tapes are received from roll-up cassettes 48 or 47 while being simultaneously exposed, if need be. After having run through printer 44, the reel 45 with the leader strip 8, end to the outside, the reel 46 with the negative strip 3, end to the outside, container and reel 47 with copies 8/13, end to the outside and with the completed marking thereon, as well as the container and reel 48 with copies 32/45, end outside, discharge from the printer.

Figure 12:
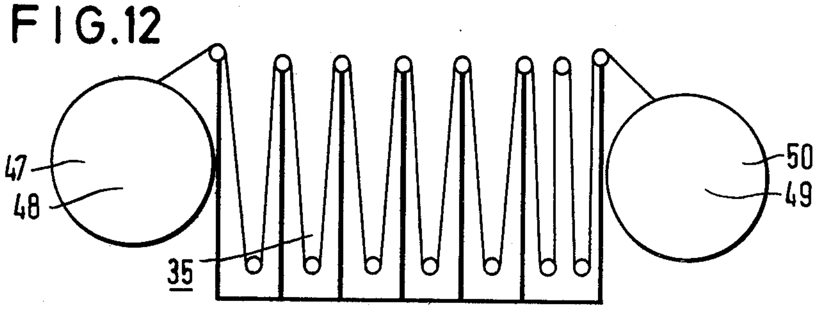
Figure 13:
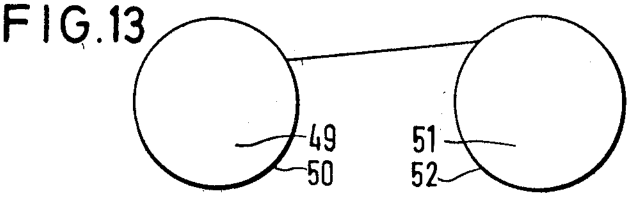
Figure 14:
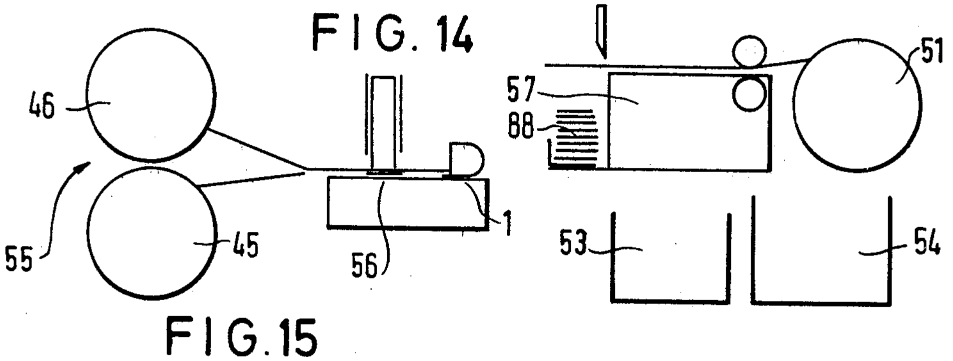

The contents of reels 47 and 48 passes through the positive development machine 35 (FIG. 12). The strips leave this machine with the beginning to the outside on reels 49 and 50. The contents of reels 49 and 50 are rolled onto reels 51 or 52 (FIG. 13) and are moved to an assembly location 55 (FIG. 14) for the finishing process. At the same time, the negative strip 3 on reel 46 is bonded onto the end strip 2 of a cartridge 1 which is removed from a box 53 and is separated from reel 46. The leader strip 8 which is drawn off from reel 45 is bonded onto the beginning of the negative film strip 3 by means of a bonding machine 56. The end-marking signal and the corresponding memory are entered on the leader 8. The paper web from reel 51 is fed into a cutting machine 57 for cutting. A catch box 88 receives the paper pictures in piles in accordance with the orders. The 35 mm archive copy which had been drawn off from reel 52 is rolled up and is placed into the order pocket together with the other copies as well as with the assembled archive or file unit (FIG. 1*a*), and the order pocket is then placed into a basket 54 for delivery sorting. Thereby, the first order processing is completed.

For reorders, the customer or the receiving center enters in the provided data fields of the order pocket 16 or the leader 8 the data for the desired picture size, type of paper, number of copies for each picture field or for all picture fields of the negative strip 3 and, if need be, changes of the subjective exposure corrections etc. are entered. Preferably, the entering is carried out in an erasable manner at least on the leader 8, so as to change the data again for later reorders.

Figure 15:
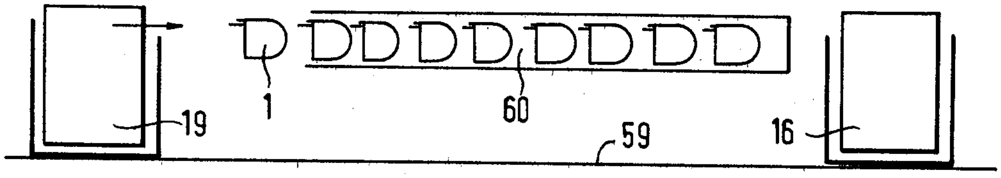
Figure 16:
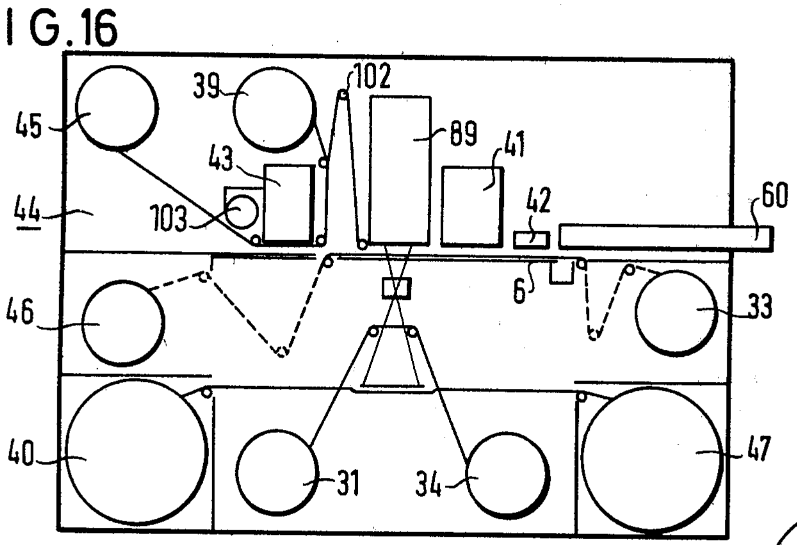

Their orders are collected in a basket 19 and received on a preparation desk 59 for reorders (FIG. 15). The cartridges 1 with negative strip 3 and the positive leader strip 8 on which the codes are entered are inserted into magazines which serve for the automatic change of the cartridges in the printer. Thereby, a soring occurs in such a manner that advantageously all orders in a magazine contain the assortment of the same size of pictures of the same material. The magazine 60 is loaded into a printer 44 (FIG. 16) which advantageously may be the same printer which was used during the first order processing (FIG. 11). However, in this case the reels 33 and 46 for the drawing off and rolling up of the negative strip are not used. The first cartridge 1 is gripped by the printer 44 and is pushed into the cartridge store wherein the pulling tape of the device is engaged with the catch 87 of the leader 8. The leader 8 and the negative strip 3 are pulled out of the cartridge. The leader 8 is positioned in the reading device 43. The data fields of the leader are read. After the data are read-out from the data field 14, controlled and stored, the transport supplies the next data field 13. Correction values from data field 13 are read and applied into a computer while the associated negative strip is scanned by the scanner 41. From information ascertained both during the reading and scanning process the exposure is determined. The scanner computer adjusts the color filters in the exposure shute 89 in accordance with the computed exposure. The exposure is triggered. In the meantime, the next data field 13 was already read and the next negative already measured. The corresponding controlled exposure is periodically repeated until the end signal in the data field 10 effects the return rolling of the negative film 3 and leader 8, as well as the expelling of the cartridge 1.

A swing roller 102 serves for balancing the length between the leader 8 and the corresponding part of the negative strip 3 so that reading device 43 always reads the data field on the leader 8 that pertains to the negative picture which is being fed into the scanner 41. The pulling band and the leader from cartridge 1 are taken-up by a small reel 103.

The development of the exposed positive tape is carried out in the development machine 35 (FIG. 9), wherein, for example, four to six webs of different width can be processed of a continuous flow method.

Figure 17:
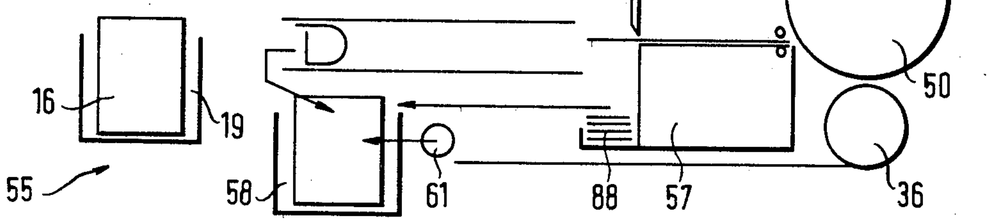

Finally, at the assembly location 55 (FIG. 17), the order pocket 16, the cartridge 1, the order copies and, if need be, coexposed archive or file tapes are assembled. The latter are stored in form of coils 61 during the transport. The order is placed into a basket for sorting and delivery.

In particular for processing less often occuring sizes and/or materials, the whole archive or file unit may be completely assembled before making production copies (FIG. 11). For this purpose the negative strip 3 and the leader strip 8 with the cartridge 1 are assembled at the assembly location corresponding to FIG. 18 and placed into a magazine 60. Thereafter, printer 44 exposes (FIG. 19) according to the entered program as in the case of FIG. 16. The development (FIG. 20) is carried out in accordance with FIG. 12 in development machine 35. The final assembly (FIG. 21) conforms with the one of FIG. 17.

By this modified type of processing long waiting times for processing less frequent order types are eliminated because it is not necessary to collect an amount of similar orders, sufficient to fill reel 33.

Within the scope of the invention numerous further variations and embodiments are possible. For example, the described methods permit to make individual copies or enlargements with printers by using the multigrade-photo papers which recently appeared on the market, and which with the present manual laboratories cannot be surpassed.

FIG. 22 shows a suitable blank forms 101 for recording cartridges 1; the blank forms during picture taking can be mounted on camera element or on a carrying case and on which objects of the pictures taken, the date when the pictures were taken, the address of the photographer, and the like, may be noted.

While the invention has been illustrated and described as embodied in specific examples of the method of and device for producing photographic copies, it is not intended to be limited to the details shown, since various modifications and structural changes may be made without departing in any way from the spirit of the present invention.

What is claimed as new and desired to be protected by Letters Patent is set forth in the appended claims:

1. A method for making positive photographic copies from uncut negative film strips which at the first order are stored in a camera cartridge in the undeveloped condition and are delivered with an order pocket which carries the general order data, comprising the steps of developing the negative film strips; making during the first order processing a positive strip copy, without making enlarged prints, including pictures of data fields arranged in conjunction with the individual positive pictures of the negative film strip for receiving relevant film processing data readable by a data processing machine; connecting the positive strip copy with one end of the developed negative film strip; and upon completion of the first order, connecting the other end of the developed negative strip with an auxiliary strip in the file cartridge to form a permanent file unit so that when it is necessary to make a reorder, it suffices to withdraw from the file cartridge only the positive strip copy with the individual positive pictures and the data fields to be read by a machine, while the negative film strip is withdrawn from the file cartridge only for making positive copies according to the reorder.

2. File unit for use in processing reorders for making positive photographic copies, comprising a developed negative film strip, a positive strip copy of the negative film strip including non-enlarged individual positive pictures with associated positive pictures of data fields for receiving relevant film processing data readable by a data processing machine, said positive strip copy being connected to one end of the negative film strip, an auxiliary strip arranged in a storing cartridge and being connected to the other end of the negative film strip so that when it is necessary to make a reorder it suffices to withdraw from the file cartridge only the positive strip copy with the individual positive pictures and the data fields to be read by a machine, while the negative film strip is withdrawn from the cartridge only for making positive copies according to the reorder.

* * * * *